United States Patent
Zhang et al.

(10) Patent No.: US 11,246,129 B2
(45) Date of Patent: Feb. 8, 2022

(54) METHOD FOR TRANSMITTING SIGNAL, NETWORK DEVICE AND TERMINAL DEVICE

(71) Applicant: GUANGDONG OPPO MOBILE TELECOMMUNICATIONS CORP., LTD., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 80 days.

(21) Appl. No.: 16/667,763

(22) Filed: Oct. 29, 2019

(65) Prior Publication Data
US 2020/0068545 A1    Feb. 27, 2020

Related U.S. Application Data

(63) Continuation of application No. PCT/CN2017/083086, filed on May 4, 2017.

(51) Int. Cl.
*H04W 72/04* (2009.01)
*H04W 56/00* (2009.01)

(52) U.S. Cl.
CPC ....... *H04W 72/044* (2013.01); *H04W 56/001* (2013.01); *H04W 72/042* (2013.01); *H04W 72/0446* (2013.01)

(58) Field of Classification Search
CPC . H04W 48/12; H04W 56/001; H04W 72/042; H04W 56/0025
See application file for complete search history.

(56) References Cited

U.S. PATENT DOCUMENTS 10,720,973 B2 * 7/2020 Lee ................. H04B 7/0456
2012/0106500 A1   5/2012 Chun et al.
(Continued)

FOREIGN PATENT DOCUMENTS

CN    102594373 A    7/2012
CN    103379079 A    10/2013
(Continued)

OTHER PUBLICATIONS

Cohere Technologies, "NR SS Burst Composition and SS Time Index Indication", 3GPP TSG-RAN Meeting #88, Feb. 2017 (Year: 2017).*

(Continued)

*Primary Examiner* — Omer S Mian
(74) *Attorney, Agent, or Firm* — Ladas & Parry, LLP

(57) ABSTRACT

The present disclosure discloses a method for transmitting a signal, a network device, and a terminal device. The method includes: a network device determines transmission information of a synchronization signal block, where the transmission information includes information on the number m of the synchronization signal block, and information on a time-domain resource set over which the m synchronization signal block is transmitted, where the time-domain resource set includes m time-domain resource unit over which the m synchronization signal block is transmitted, and locations of m time-domain resource units in different time-domain resource sets are not completely the same; the network device sending the transmission information to a terminal device, so that the terminal device receives, according to the transmission information, the m synchronization signal block transmitted by the network device.

21 Claims, 13 Drawing Sheets

(56) References Cited

U.S. PATENT DOCUMENTS

| | | | |
|---|---|---|---|
| 2017/0093522 | A1 | 3/2017 | Bright-Thomas et al. |
| 2018/0262313 | A1* | 9/2018 | Nam ................. H04L 5/005 |
| 2020/0068512 | A1* | 2/2020 | Xue ................. H04W 56/001 |
| 2020/0305197 | A1* | 9/2020 | Kim ................. H04W 72/0446 |

FOREIGN PATENT DOCUMENTS

| | | |
|---|---|---|
| CN | 105338568 A | 2/2016 |
| CN | 105723639 A | 6/2016 |
| CN | 106134204 A | 11/2016 |
| WO | 2017052843 A1 | 3/2017 |
| WO | 2018201403 A1 | 11/2018 |

OTHER PUBLICATIONS

ZTE, "Composition of SS block, burst and burst set" 3GPP TSG RAN WG1 Meeting #88bis Spokane, USA Apr. 3-7, 2017, R1-1704358). (Year: 2017).*

The first Office Action of corresponding Japanese application No. 2019-558770, dated Apr. 13, 2021.

Intel Corporation, Signaling configuration for xSS[online], 3GPP TSG RAN WG2 #97bis, 3GPP, Apr. 7, 2017, R2-1703419, Internet<URL:http://www.3gpp.org/ftp/tsg_ran/WG2_RL2/TSGR2_97bis/Docs/R2-1703419.zip>.

The EESR of corresponding European application No. 21152138.0, dated April 22, 2021.

The First Office Action of corresponding Korean application No. 10-2019-7032968, dated May 8, 2021.

The first Office Action of corresponding Indian application No. 201917044924, dated May 10, 2021.

Intel Corporation, 3GPP TSG RAN WG1 Meeting #87 R1-1611969; On NR initial access and mobility Reno, Nevada, U.S.A., Nov. 14-18, 2016.

Ericsson, 3GPP TSG-RAN WG1 NR adhoc R1-1700292; NR synchronization signal bandwidth and multiplexing Spokane, WA, USA, Jan. 16-20, 2017.

The EESR of corresponding European application No. 17908668.1, dated Feb. 28, 2020.

The First Office Action of corresponding Chinese application No. 201780089918.X, dated May 7, 2020.

ZTE te al: "Composition of SS block, burst and burst set", 3GPP Draft; R1-1704358, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017(Apr. 2, 2017), XP051242506.

Huawei et al: "Discussian on SS burst set composition and SS block time index indication", 3GPP Draft; R1-1705052, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017(Apr. 2, 2017), XP051243183.

"3rd Generation Partnership Project; Technical Specification Group Radio Access Network; Study on New Radio Access Technology Physical Layer Aspects(Release 14)", 3GPP Standrd; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.0.0, Mar. 25, 2017(Mar. 25, 2017), pp. 1-143, XP051297632.

International Search Report in the international application No. PCT/CN2017/083086, dated Jan. 24, 2018.

Written Opinion of the International Search Authority in the international application No. PCT/CN2017/083086, dated Jan. 18, 2018 and English translation provided by Google Translate.

3GPP TSG RAN WG1 #88bis, R1-1705318, "SS block composition, SS burst set composition and SS time index indication".

The first Office Action of corresponding Taiwan application No. 107114481, dated Jul. 15, 2021.

* cited by examiner

METHOD FOR TRANSMITTING SIGNAL, NETWORK DEVICE AND TERMINAL DEVICE

CROSS-REFERENCE TO RELATED APPLICATIONS

This application is a continuation of International Application No. PCT/CN2017/083086, filed on May 4, 2017, the content of which is incorporated herein by reference in its entirety.

TECHNICAL FIELD

Embodiments of the present application relate to the field of wireless communications, and in particular, to a method for transmitting a signal, a network device and a terminal device.

BACKGROUND

In a Long Term Evolution (LTE) system, locations of time-domain resources occupied by a synchronization signals such as a Primary Synchronization Signal (PSS) and a Secondary Synchronization Signal (SSS) during transmission are fixed.

However, in a 5G system, or New Radio (NR), an entire cell can be covered by different beams, where each beam covers a small range in the cell, and an effect of multiple beams covering the entire cell is achieved by temporal sweeping. Since different synchronization signal blocks (SS Blocks) can be transmitted on different beams, locations of time-domain resources occupied by the synchronization signal blocks during transmission can be flexibly changed.

Therefore, how to effectively indicate the locations of the time-domain resources for transmitting the synchronization signal blocks is an urgent problem to be solved.

SUMMARY

The embodiments of the present disclosure provide a method for transmitting a signal, a network device and a terminal device, which can effectively indicate locations of time-domain resources for transmitting synchronization signal blocks.

A first aspect provides a method for transmitting a signal, including:

determining, by a network device, transmission information of a synchronization signal block, where the transmission information includes information on the number m of the synchronization signal block, and information on a time-domain resource set over which the m synchronization signal block is transmitted, where the time-domain resource set includes m time-domain resource units over which the m synchronization signal block is transmitted, and locations of m time-domain resource units in different time-domain resource sets are not completely the same, where m is a positive integer; and transmitting, by the network device, the transmission information to a terminal device, so that the terminal device receives, according to the transmission information, the m synchronization signal block transmitted by the network device.

Therefore, in the embodiment of the present application, when transmitting the synchronization signal blocks, the network device indicates the number of the synchronization signal blocks and corresponding specific time-domain locations to the terminal device, thereby an indication of the locations of the time-domain resources of the synchronization signal blocks can be achieved using few bits and the signaling overhead is reduced.

In an embodiment, in an implementation of the first aspect, where $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, in an implementation of the first aspect, $n = C_k^m$, k represents the number of time-domain resource unit over which the m synchronization signal block is capable of being transmitted, k is a positive integer, and $k \geq m$.

In an embodiment, in an implementation of the first aspect, location of the m time-domain resource unit in each of the time-domain resource sets among the multiple time-domain resource sets satisfies a first condition.

In an embodiment, in an implementation of the first aspect, the first condition is determined by the network device, or agreed by the network device and the terminal device in advance.

In an embodiment, in an implementation of the first aspect, the transmission information further includes resource configuration information, where the resource configuration information is configured to indicate the first condition that the locations of the m time-domain resource units in each of the time-domain resource sets should satisfy.

In an embodiment, in an implementation of the first aspect, among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, in an implementation of the first aspect, the fixed number is determined by the network device, or agreed by the network device and the terminal device in advance.

In an embodiment, in an implementation of the first aspect, each of the m time-domain resource units includes at least one symbol.

In an embodiment, in an implementation of the first aspect, the synchronization signal block includes at least one of the following signals: a primary synchronization signal (PSS), a secondary synchronization signal (SSS), and a physical broadcast channel (PBCH).

A second aspect provides a method for transmitting a signal, including:

receiving, by a terminal device, transmission information of a synchronization signal block transmitted by a network device, where the transmission information includes information on the number m of the synchronization signal block, and information on a time-domain resource set over which the m synchronization signal block is transmitted, where the time-domain resource set includes m time-domain resource units over which the m synchronization signal block is transmitted, and locations of m time-domain resource units in different time-domain resource sets are not completely the same, where m is a positive integer; and receiving, by the terminal device, the m synchronization signal block transmitted by the network device according to the transmission information.

Therefore, in the embodiment of the present application, when receiving the synchronization signal blocks, the terminal device obtains the number of the synchronization signal blocks and corresponding specific time-domain locations indicated by the terminal device, thereby the locations of the time-domain resources of the synchronization signal blocks can be obtained using few bits and the signaling overhead is reduced.

In an embodiment, in an implementation of the second aspect, $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, in an implementation of the second aspect, $n=C_k^m$, k represents the number of time-domain resource unit over which the m synchronization signal block is capable of being transmitted, k is a positive integer, and $k \geq m$.

In an embodiment, in an implementation of the second aspect, location of the m time-domain resource unit in each of the time-domain resource sets among the multiple time-domain resource sets satisfies a first condition.

In an embodiment, in an implementation of the second aspect, the first condition is determined by the network device, or agreed by the terminal device and the network device in advance.

In an embodiment, in an implementation of the second aspect, the transmission information further includes resource configuration information, where the resource configuration information is configured to indicate the first condition that the locations of the m time-domain resource units in each of the time-domain resource sets should satisfy.

In an embodiment, in an implementation of the second aspect, the first condition includes: among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, in an implementation of the second aspect, the fixed number is determined by the network device, or agreed by the network device and the terminal device in advance.

In an embodiment, in an implementation of the second aspect, each of the m time-domain resource units includes at least one symbol.

In an embodiment, in an implementation of the second aspect, the synchronization signal block includes at least one of the following signals: a primary synchronization signal (PSS), a secondary synchronization signal (SSS), and a physical broadcast channel (PBCH).

A third aspect provides a network device, and the network device may perform operations, in the first aspect or any optional implementation of the first aspect, of the network device. In particular, the network device may include modular units configured to perform the operations, in the first aspect or any possible implementation of the first aspect, of the network device.

A fourth aspect provides a terminal device, and the terminal device may perform operations, in the second aspect or any optional implementation of the second aspect, of the terminal device. In particular, the terminal device may include modular units configured to perform the operations, in the second aspect or any possible implementation of the second aspect, of the terminal device.

A fifth aspect provides a network device, and the network device includes: a processor, a transceiver and a memory. The processor, the transceiver, and the memory communicate with one another via internal connection paths. The memory is configured to store instructions, and the processor is configured to execute the instructions stored by the memory. When the processor executes the instructions stored in the memory, the execution causes the network device to perform the method in the first aspect or any possible implementation of the first aspect, or the execution causes the network device to implement the network device provided by the third aspect.

A sixth aspect provides a terminal device, and the terminal device includes: a processor, a transceiver, and a memory. The processor, the transceiver, and the memory communicate with one another through internal connection paths. The memory is configured to store instructions, and the processor is configured to execute the instructions stored by the memory. When the processor executes the instructions stored in the memory, the execution causes the terminal device to perform the method in the second aspect or any possible implementation of the second aspect, or the execution causes the terminal device to implement the terminal device provided by the fourth aspect.

A seventh aspect provides a computer readable storage medium, and the computer readable storage medium stores a program, and the program causes a network device to perform any one of the methods for transmitting a signal in the first aspect and various implementations thereof.

An eighth aspect provides a computer readable storage medium, and the computer readable storage medium stores a program, and the program causes a terminal device to perform any one of the methods for transmitting a signal in the second aspect and various implementations thereof.

A ninth aspect provides a system on chip, and the system on chip includes an input interface, an output interface, a processor, and a memory, where the processor is configured to execute instructions stored by the memory, and when the instructions are executed, the processor can implement any one of the methods in the foregoing first aspect and various implementations thereof.

A tenth aspect provides a system on chip, and the system on chip includes an input interface, an output interface, a processor, and a memory, where the processor is configured to execute instructions stored by the memory, and when the instructions are executed, the processor can implement any one of the methods in the foregoing second aspect and various implementations thereof.

DESCRIPTION OF EMBODIMENTS

The technical solutions in the embodiments of the present application will be described below with reference to the accompanying drawings.

It should be understood that the technical solutions of the embodiments of the present application can be applied to various communication systems, such as a Global System of Mobile Communication (GSM) system, a Code Division Multiple Access (CDMA) system, and a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

The present application describes various embodiments in connection with a terminal device. The terminal device may also refer to a user equipment (UE), an access terminal, a user unit, a user station, a moving station, a mobile station, a remote station, a remote terminal, a mobile device, a user terminal, a terminal, a wireless communication device, and a user agent, or a user device. The access terminal may be a cellular phone, a cordless phone, a Session Initiation Protocol (SIP) phone, a Wireless Local Loop (WLL) station, a Personal Digital Assistant (PDA), a handheld device, a computing device with wireless communication function, or another processing device, vehicle-mounted device, wearable device connected to a wireless modem, a terminal device in a future 5G network, or a terminal device in a future evolved Public Land Mobile Network (PLMN) network, etc.

The present application describes various embodiments in connection with a network device. The network device may be a device for communicating with the terminal device, for example, may be a Base Transceiver Station (BTS) in a GSM system or a CDMA, or may be a NodeB (NB) in a WCDMA system, or may be an Evolutional Node B (eNB or eNodeB) in an LTE system, or the network device may be a relay station, an access point, an vehicle-mounted device, a wearable device, or a network side device in a future 5G network or a network side device in a future evolved PLMN network, etc.

Figure 1:
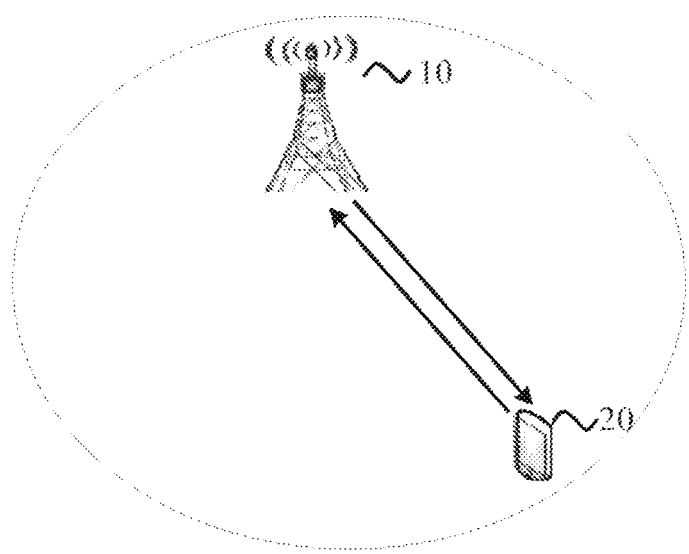
FIG. 1 is a schematic structural diagram of an application scenario of embodiments of the present application.

FIG. 1 is a schematic structural diagram of an application scenario of embodiments of the present application. The communication system in FIG. 1 may include a network device 10 and a terminal device 20. The network device 10 is configured to provide communication services for the terminal device 20 and access a core network. The terminal device 20 can access a network by searching for synchronization signals, broadcast signals, and the like transmitted by the network device 10, thereby performing communication with the network. The arrows shown in FIG. 1 may represent uplink/downlink transmissions by a cellular link between the terminal device 20 and the network device 10.

The network in the embodiments of the present application may refer to a Public Land Mobile Network (PLMN) or a Device to Device (D2D) network or a Machine to Machine/Man (M2M) network or other networks, and FIG. 1 is only a simplified schematic diagram of an example, and other terminal devices may also be included in the network, which are not shown in FIG. 1.

Figure 2:
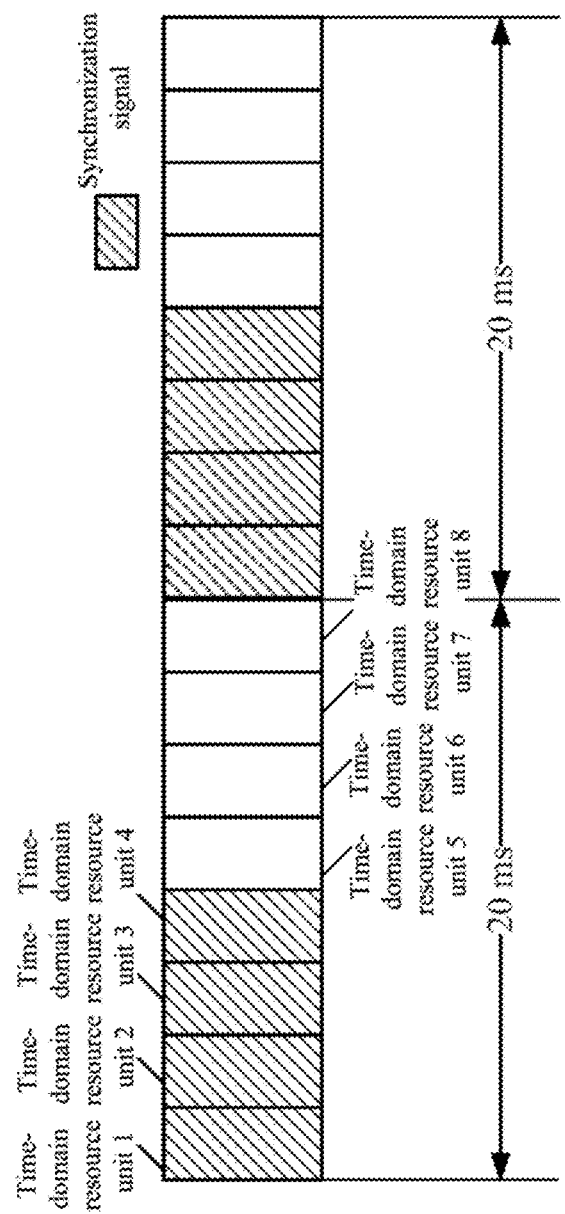
FIG. 2 is a schematic diagram of flexible transmission of synchronization signal blocks on different time-domain resource units.

In a 5G system, an entire cell can be covered by different beams, where each beam covers a small range in the cell, and an effect of multiple beams covering the entire cell is achieved by temporal sweeping. As shown in FIG. 2, it is assumed that the system includes 4 beams, and each beam is configured to transmit a different synchronization signal block (SS block), that is, a synchronization signal block i (i=1, 2, 3 or 4) is transmitted on a beam i. It is assumed that there is a total of k symbols that can be used to transmit synchronization signal blocks in a 20 ms period. Multiple synchronization signal blocks actually transmitted during the period are combined into a SS burst set.

Figure 3:
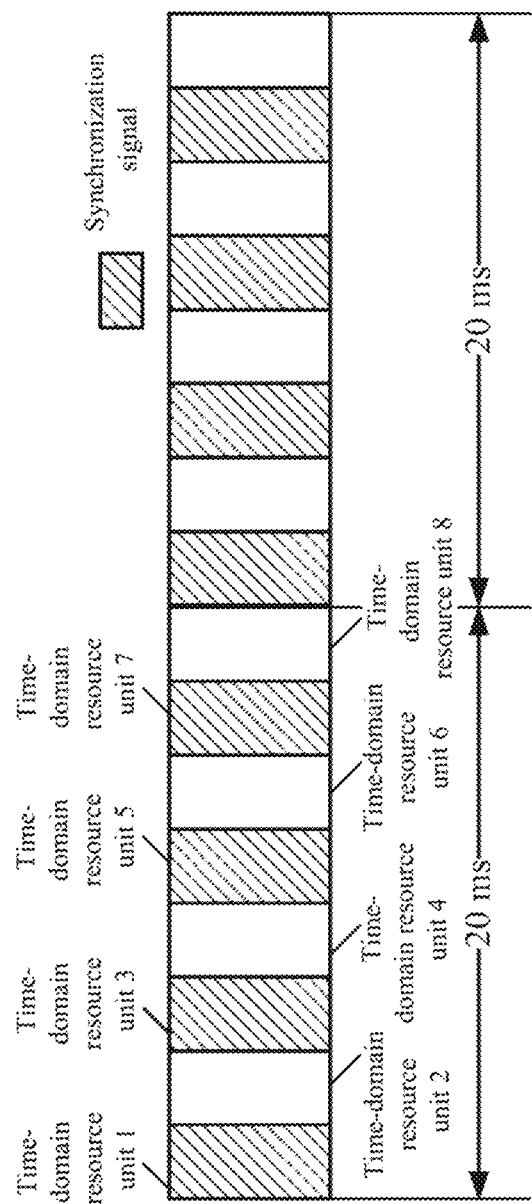
FIG. 3 is a schematic diagram of flexible transmission of synchronization signal blocks on different time-domain resource units.
Figure 4:
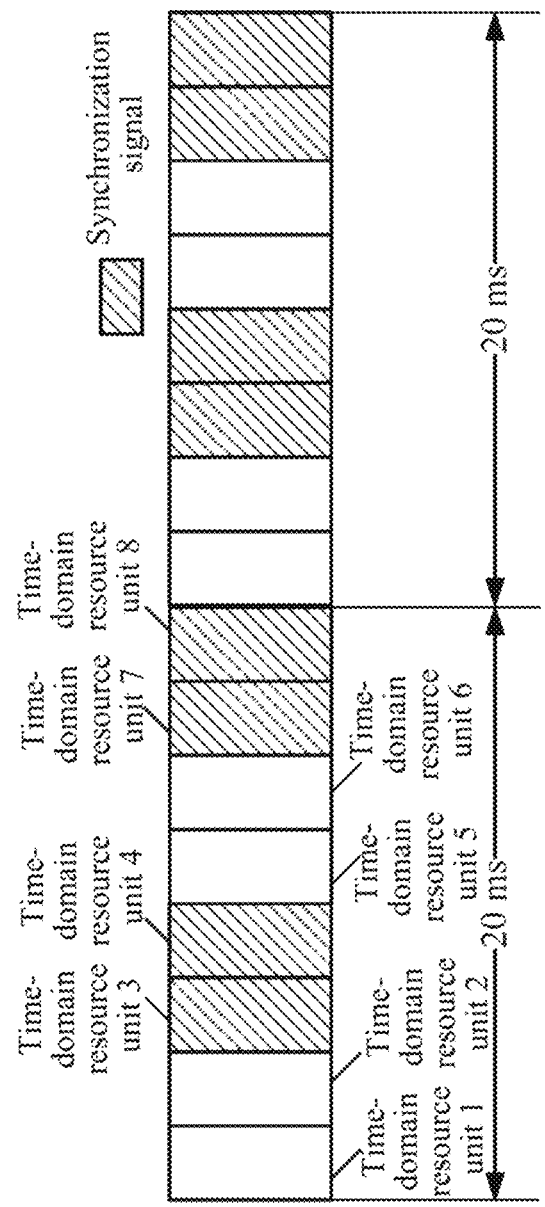
FIG. 4 is a schematic diagram of flexible transmission of synchronization signal blocks on different time-domain resource units.

As shown in FIG. 2, in a same cell, locations of time-domain resources occupied by synchronization signal blocks that the terminal device needs to detect are not fixed in the period. For example, as shown in FIG. 2, the synchronization signal blocks may occupy the first four time-domain resource units in a k time-domain resource units, and in the schematic diagram of transmission of synchronization signal blocks shown in FIG. 3, the synchronization signal blocks occupy the first, the third, the fifth, and the seventh time-domain resource units of the k time-domain resource units, and in the schematic diagram of transmission of synchronization signal blocks shown in FIG. 4, the synchronization signal blocks occupy the third, the fourth, the seventh and the eighth time-domain resource units of the k time-domain resource units. It can be seen that in the 5G system, the locations of time-domain resource units occupied by synchronization signal blocks have a certain flexibility.

One way of effectively indicating the locations of time-domain resource units for transmitting synchronization signal blocks is to form a bitmap, with k bits, and each bit is used to indicate whether a synchronization signal block (SS block) is transmitted on its corresponding location of time-domain. It is thus possible to intuitively represent various possibilities of locations of time-domain resources of synchronization signal blocks.

However, the signaling overhead of this method is extremely large, especially when the period of transmission of synchronization signal blocks is long, and the number of synchronization signal blocks transmitted in each period is small, which causes a waste of large amount of signaling. For example, when locations of k possible time-domain resource units over which the synchronization signal blocks are transmitted in one period, but actually there is only one synchronization signal block transmitted in the period, a bitmap with k bits may cause a great waste.

It should be understood that the time-domain resource unit in the embodiments of the present application includes at least one symbol such as a Orthogonal Frequency Division Multiplexing (OFDM) symbol, and one time slot may include one or more time-domain resource units, and one time-domain resource unit can transmit one synchronization signal block, which may occupy at least one symbol.

In the embodiments of the present application, when transmitting the synchronization signal blocks, the network device indicates the number of the synchronization signal blocks and corresponding specific time-domain locations to the terminal device, thereby an indication of the locations of the time-domain resources of the synchronization signal blocks can be achieved using few bits and the signaling overhead is reduced.

Figure 5:
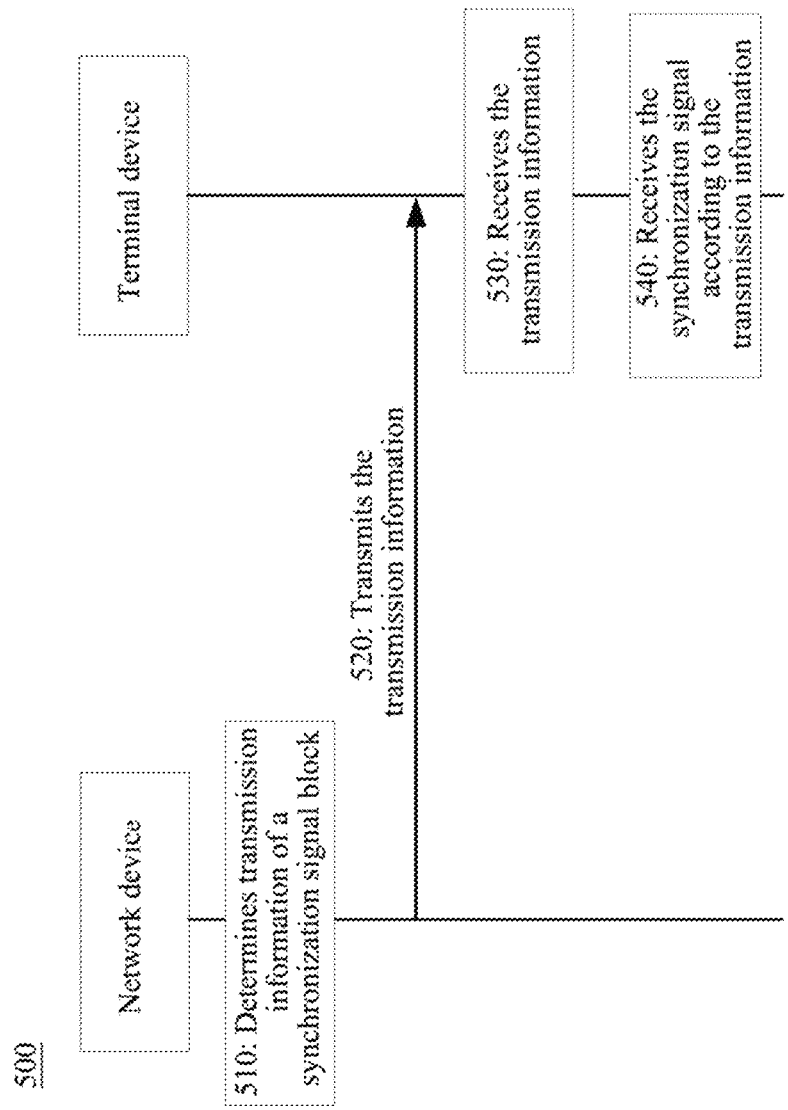
FIG. 5 is a flow interaction diagram of a method for transmitting a signal according to an embodiment of the present application.

FIG. 5 is a flow interaction diagram of a method for transmitting a signal according to an embodiment of the present application. The network device in FIG. 5 may be, for example, the network device 10 in FIG. 1. The terminal device in FIG. 5 may be, for example, the terminal device 20 in FIG. 1. As shown in FIG. 5, the method for transmitting a signal includes:

in 510, the network device determines transmission information of a synchronization signal block.

The transmission information includes information on the number m of the synchronization signal block and information on a time-domain resource set over which the m synchronization signal block is transmitted.

In an embodiment, $\lceil \log_2(n) \rceil$ represents the number of bits occupied by the information on the time-domain resource set in the transmission information, where n represents the number of multiple time-domain resource sets over which the m synchronization signal block is capable of being transmitted, and locations of m time-domain resource units over which m synchronization signal blocks are transmitted in different time-domain resource sets are not completely the same, where m is a positive integer, and n is a positive integer.

Each time-domain resource set in the multiple time-domain resource sets includes at least one time-domain resource unit. In an embodiment, the time-domain resource unit includes at least one symbol. One synchronization signal block may be transmitted over one time-domain resource unit.

In an embodiment, the time-domain synchronization signal block includes at least one of the following signals: a primary synchronization signal (PSS), a secondary synchronization signal (SSS), and a physical broadcast channel (PBCH).

It should be understood that the synchronization signal block may include at least one of information such as PSS, SSS, PBCH, and DMRS (demodulation reference signal) for demodulating the PBCH. The information may be collectively referred to as one synchronization signal block, and the one synchronization signal occupies a certain number of symbols (here referred to as time-domain resource units) for transmission.

Further, the PBCH may carry a corresponding demodulation reference signal (DMRS).

Specifically, when the network device transmits the synchronization signal block to the terminal device, the transmission information of the synchronization signal blocks needs to be transmitted to the terminal device to indicate the number m of the synchronization signal block and the time-domain resource set over which the m synchronization signal block is transmitted, so that the terminal device can correctly receive the m synchronization signal block. If there are n possible time-domain resource sets over which the m synchronization signal block is capable of being transmitted, the number of bits occupied by the information of the time-domain resource set over which the m synchronization signal block is transmitted included in the transmission information is $\lceil \log_2(n) \rceil$. Among the n possible time-domain resource sets, the location of m time-domain resource unit over which the m synchronization signal block is transmitted in each time-domain resource set and the location of the m time-domain resource unit over which the m synchronization signal block is transmitted in other time-domain resource set of the multiple time-domain resource sets are not completely the same.

Figure 6:
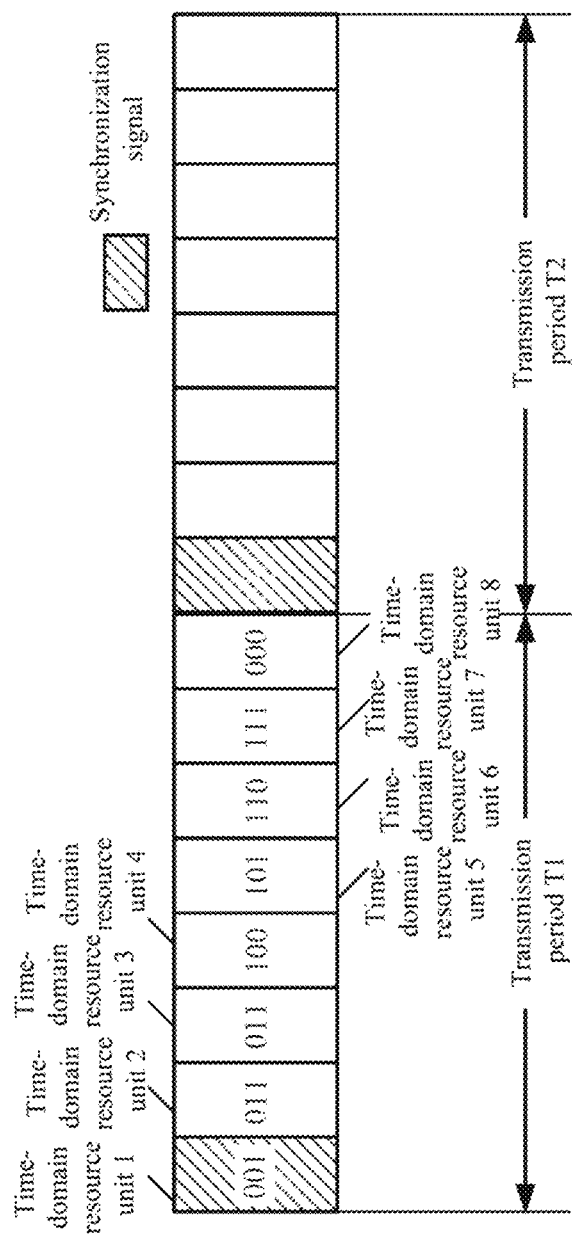
FIG. 6 is a schematic diagram of time-domain resources of synchronization signal blocks according to an embodiment of the present application.

For example, as shown in FIG. 6, assuming that 8 time-domain resource units are included in a transmission period of the synchronization signal block, the network device transmits one synchronization signal block, that is, m=1, to the terminal device over time-domain resource unit 1. It is assumed that the n time-domain resource sets over which the synchronization signal block is capable of being transmitted include time-domain resource unit 1 to time-domain resource unit 8, respectively, and each time-domain resource unit may include at least one symbol for transmitting the synchronization signal block. The transmission information transmitted by the network device to the terminal device includes m=1, and information on the time-domain resource set, that is, time-domain resource unit 1, for transmitting the one synchronization signal block. The time-domain resource set may be indicated by $\lceil \log_2(8) \rceil = 3$ bits. For example, "001" is used to indicate that the synchronization signal block is transmitted over the first time-domain resource unit, that is, time-domain resource unit 1, "010" is used to indicate that the synchronization signal block is transmitted over time-domain resource unit 2, "011" is used to indicate that the synchronization signal block is transmitted over time-domain resource unit 3, "100" is used to indicate that the synchronization signal block is transmitted over time-domain resource unit 4, "101" is used to indicate that the synchronization signal block is transmitted over time-domain resource unit 5, "110" is used to indicate that the synchronization signal block is transmitted over time-domain resource unit 6, "111" is used to indicate that the synchronization signal block is transmitted over time-domain resource unit 7, and "000" is used to indicate that the synchronization signal block is transmitted over time-domain resource unit 8. Since the network device transmits the synchronization signal block to the terminal device on time-domain resource unit 1, the terminal device can be indicated by the "001" that the synchronization signal block is located in the time domain resource unit 1, that is, the information on the time-domain resource set included in the transmission information is "001".

In an embodiment, $n = C_k^m$, k represents the number of time-domain resource unit over which the m synchronization signal block is capable of being transmitted, k is a positive integer, and $k \geq m$.

Figure 7:
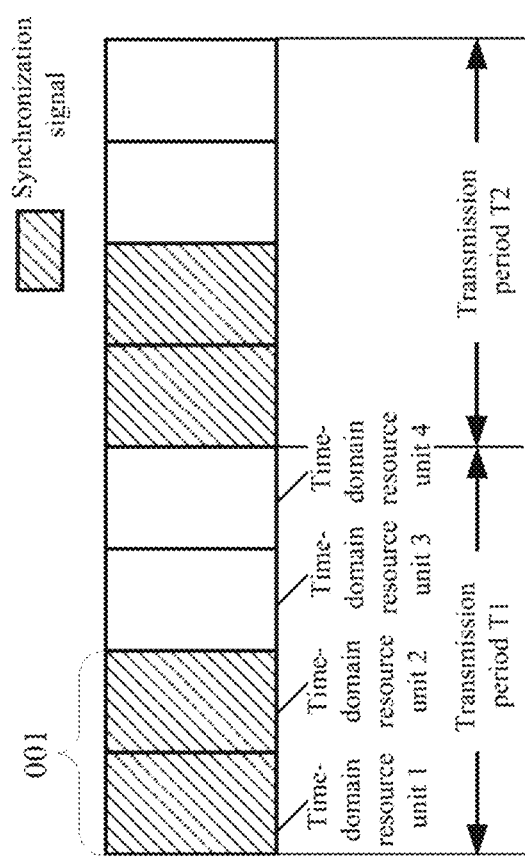
FIG. 7 is a schematic diagram of time-domain resources of synchronization signal blocks according to an embodiment of the present application.

For example, as shown in FIG. 7, it is assumed that 4 time-domain resource units over which the synchronization signal block is transmitted are included in a transmission period of the synchronization signal block, and the network device transmits two synchronization signal blocks to the terminal device on time-domain resource unit 1 and time-domain resource unit 2, that is, m=2. Assuming that the number of time-domain resource units over which the two synchronization signal blocks are transmitted is k=4 (time-domain resource unit 1 to time-domain resource unit 4), the number of time-domain resource sets over which the two synchronization signal blocks are capable of being transmitted n=$C_k^m$=$C_4^2$=6, where the 6 time-domain resource sets include: time-domain resource unit 1 and time-domain resource unit 2, time-domain resource unit 1 and time-domain resource unit 3, time-domain resource unit 1 and time-domain resource unit 4, time-domain resource unit 2 and time-domain resource unit 3, time-domain resource unit 2 and time-domain resource unit 4, time-domain resource unit 3 and time-domain resource unit 4, respectively. The transmission information transmitted by the network device to the terminal device includes m=2, and information on the time-domain resource set (that is, time-domain resource unit 1 and time-domain resource unit 2) over which the two synchronization signal blocks are transmitted.

The time-domain resource set over which the two synchronization signal blocks are transmitted may be indicated by $\lceil\log_2(6)\rceil$=3 bits. For example, "001" is used to indicate that the synchronization signal blocks are transmitted over time-domain resource unit 1 and time-domain resource unit 2, "010" is used to indicate that the synchronization signal blocks are transmitted over time-domain resource unit 1 and time-domain resource unit 3, "011" is used to indicate that the synchronization signal blocks are transmitted on time-domain resource unit 1 and time-domain resource unit 4, and "100" is used to indicate that the synchronization signal blocks are transmitted on time-domain resource unit 2 and time-domain resource unit 3, and "101" is used to indicate that the synchronization signal blocks are transmitted on time-domain resource unit 3 and time-domain resource unit 4. Since the network device transmits the synchronization signal blocks to the terminal device over time-domain resource unit 1 and time-domain resource unit 2, it can be indicated to the terminal device that the synchronization signal blocks are located on time-domain resource unit 1 and time-domain resource unit 2 by "001", that is, the information on the time-domain resource set included in the transmission information is "001".

In an embodiment, location of the m time-domain resource unit over which the m synchronization signal block is transmitted in each of the time-domain resource sets among the multiple time-domain resource sets satisfies a first condition.

In an embodiment, the first condition is determined by the network device and indicated to the terminal device, or agreed by the network device and the terminal device in advance, for example, specified in a protocol.

Specifically, in the multiple time-domain resource sets over which the m synchronization signal block is capable of being transmitted, the location of the m time-domain resource unit over which the m synchronization signal block is transmitted in each of the time-domain resource sets satisfies the first condition. The first condition is, for example, among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

The fixed number is determined by the network device, or agreed by the network device and the terminal device in advance, for example, specified in the protocol.

It should be understood that the "continuous" or "spaced" between the time-domain resource units herein is only for the time-domain resource units over which the synchronization signal block is transmitted in the multiple time-domain resource units. That is to say, there are no other time-domain resource units for transmitting synchronization signal blocks between the continuous m time-domain resource units, but the continuous m time-domain resource units may be spaced by time-domain resource units or symbols that are not used to transmit the synchronization signal blocks.

Figure 8:
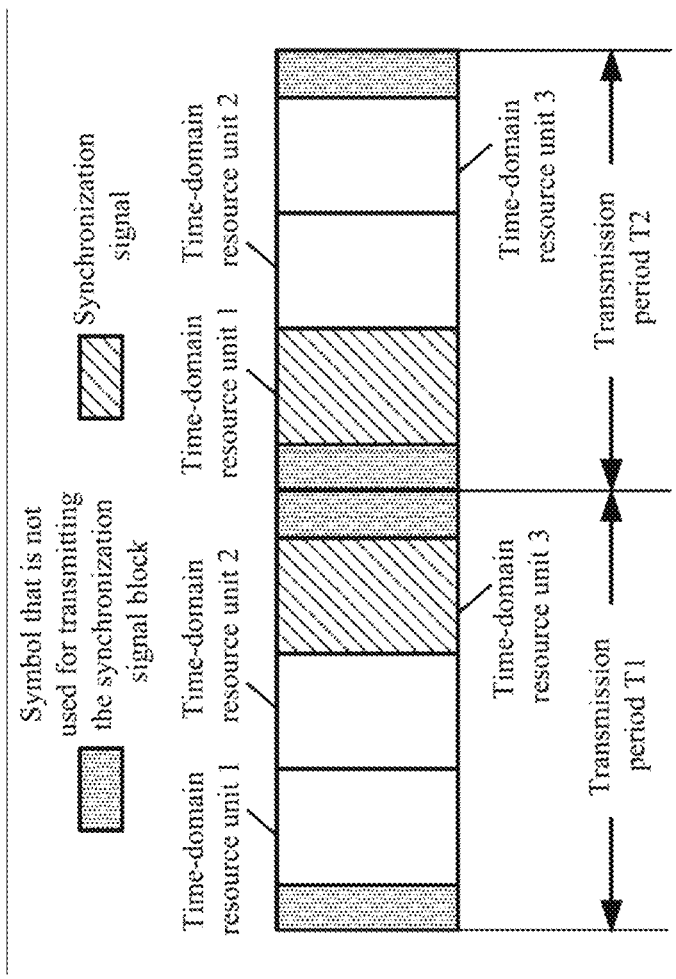
FIG. 8 is a schematic diagram of time-domain resources of synchronization signal blocks according to an embodiment of the present application.

For example, as the diagram of resources shown in FIG. 8, it is assumed that 14 symbols are included in a transmission period of the synchronization signal blocks, and the first symbol and the fourth symbol of the 14 symbols are not used for transmitting the synchronization signal blocks, and the symbols used for transmitting the synchronization signal blocks are from the second symbol to the thirteenth symbol. From the second symbol to the thirteenth symbol, three time-domain resource units for transmitting synchronization signal blocks are formed, and each time-domain resource unit includes four symbols and is used to transmit one synchronization signal block. The time-domain resource unit 1 includes the second, the third, the fourth, and the fifth symbol, and the time-domain resource unit 2 includes the sixth, the seventh, the eighth, and the ninth symbol, and the time-domain resource unit 3 includes the tenth, eleventh, twelfth, and thirteenth symbol. As shown in FIG. 8, the time-domain resource unit 3 in the transmission period T1 and the time-domain resource unit 1 in the transmission period T2 are continuous because the symbols 14 and 1 between the time-domain resource unit 3 in the transmission period T1 and the time-domain resource unit 1 in the transmission period T2 are not used to transmit the synchronization signal blocks.

If spanning the transmission period of the synchronization signal blocks is allowed, then relative to the part of time-domain resources from the second symbol to the thirteenth symbol, that is, from the time-domain resource unit 1 to the time-domain resource unit 3, in the two periods, the time-domain resource unit 3 in T1 and the time-domain resource unit 1 in T2 are continuous and can form a time-domain resource set for transmitting the synchronization signal blocks.

When the m time-domain resource units over which the m synchronization signal block is transmitted must be continuous, there is only n=k (spanning a transmission period of the synchronization signal blocks is allowed) or n=k−1 (spanning a transmission period of the synchronization signal blocks is not allowed) possibilities, $\lceil\log_2(k)\rceil$ or $\lceil\log_2(k-1)\rceil$ bits are respectively required to indicate the m time-domain resource units over which the m synchronization signal blocks are transmitted.

When the m time-domain resource units over which the m synchronization signal blocks are transmitted must be spaced by k/2 time-domain resource units, then $\lceil\log_2(k/2)\rceil$ (k is an even number) or $\lceil\log_2(\lceil k/2\rceil)\rceil$ (k is an odd number) bits are required to indicate the m time-domain resource units over which the m synchronization signal blocks are transmitted.

Figure 9:
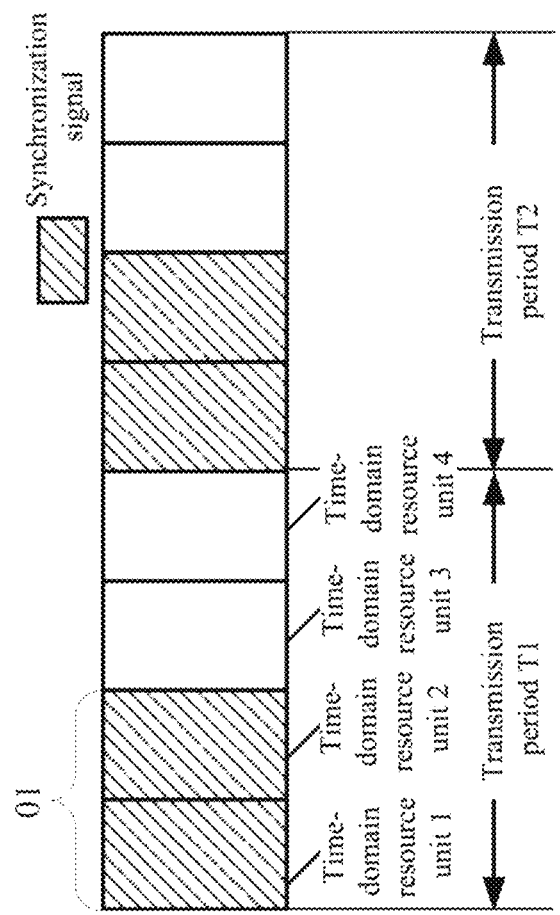
FIG. 9 is a schematic diagram of time-domain resources of synchronization signal blocks according to an embodiment of the present application.

For example, as shown in FIG. 9, it is specified in the protocol that, the two time-domain resource units over which the two synchronization signal blocks are transmitted in the multiple time-domain resource sets should be continuous when m=2 (spanning a transmission period of the synchronization signal blocks is allowed). Assuming that the number of the time-domain resource units over which the two synchronization signal blocks are capable of being transmitted is k=4 (from time-domain resource unit 1 to time-domain resource unit 4), the number of multiple time-domain resource sets over which the two synchronization signal blocks are capable of being transmitted and whose locations of time-domain resource units satisfy the first condition (time-domain resource units are continuous) is n=4, where the 4 time-domain resource sets respectively include: time-domain resource unit 1 and time-domain resource unit 2, time-domain resource unit 2 and time-domain resource unit 3, time-domain resource unit 3 and time-domain resource unit 4, time-domain resource unit 1 and time-domain resource unit 4 (when spanning a periodic boundary). Here the number of bits occupied by the information of the time-domain resource set in the transmission information is $\lceil \log_2(4) \rceil=2$.

The time-domain resource set over which the two synchronization signal blocks are transmitted may be indicated by $\lceil \log_2(4) \rceil=2$ bits, for example, "01" is used to indicate that the time-domain resource set includes time-domain resource unit 1 and time-domain resource unit 2, that is, the synchronization signal blocks are transmitted over the time-domain resource unit 1 and the time-domain resource unit 2, "10" is used to indicate that the time-domain resource set includes time-domain resource unit 2 and time-domain resource unit 3, that is, the synchronization signal blocks are transmitted over the time-domain resource unit 2 and the time-domain resource unit 3, "11" is used to indicate that the time-domain resource set includes time-domain resource unit 3 and time-domain resource unit 4, that is, the synchronization signal blocks are transmitted over the time-domain resource unit 3 and the time-domain resource unit 4, and "00" is used to indicate that the time-domain resource set includes time-domain resource unit 1 and time-domain resource unit 4, that is, the synchronization signal blocks are transmitted over the time-domain resource unit 1 and the time-domain resource unit 4. If the network device transmits the synchronization signal blocks to the terminal device over the time-domain resource unit 1 and the time-domain resource unit 2, it can be indicated to the terminal device that the synchronization signal blocks are located on the time-domain resource unit 1 and the time-domain resource unit 2 by "01", that is, the information on the time-domain resource set included in the transmission information is "01".

In an embodiment, the transmission information further includes resource configuration information, where the resource configuration information is configured to indicate the first condition that the locations of the m time-domain resource units over which the m synchronization signal blocks are transmitted in each of the time-domain resource sets should satisfy.

That is, the locations of the m time-domain resource units over which the m synchronization signal blocks are transmitted in each time-domain resource set may be required to satisfy a certain condition, and it can be indicated to the terminal device through the resource configuration information that the network device specifically uses a time-domain resource set satisfying which condition when transmitting the synchronization signal block to the terminal device. The resource configuration information may be carried in the transmission information and transmitted to the terminal device together, so that the terminal device determines, according to the resource configuration information, the m time-domain resource unit over which the m synchronization signal block is transmitted according to the information of $\lceil \log_2(n) \rceil$ bits for indicating the time-domain resource set, among the n time-domain resource sets corresponding to the resource configuration information.

Figure 10:
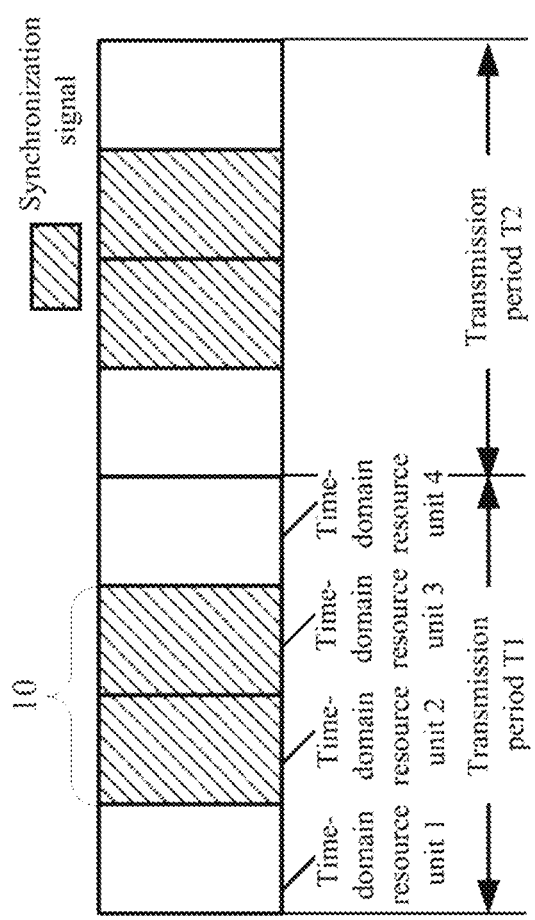
FIG. 10 is a schematic diagram of time-domain resources of synchronization signal blocks according to an embodiment of the present application.
Figure 11:
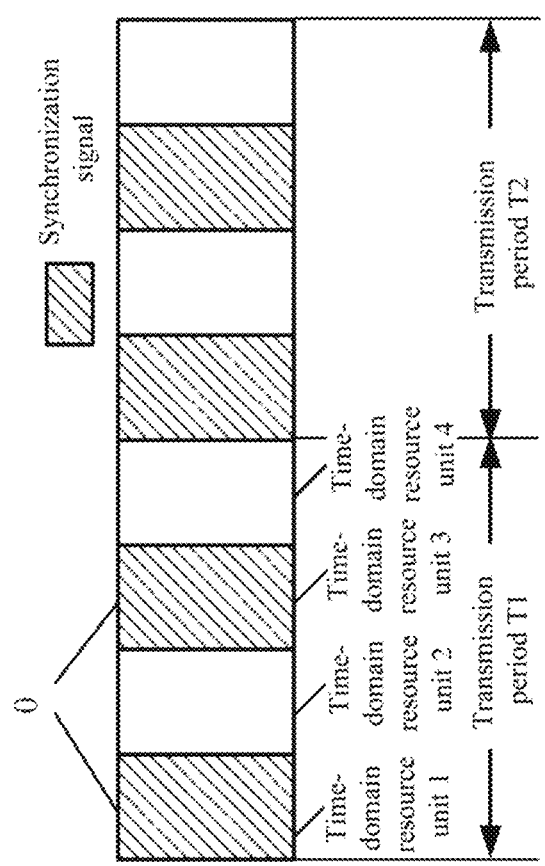
FIG. 11 is a schematic diagram of time-domain resources of synchronization signal blocks according to an embodiment of the present application.

For example, as shown in FIG. 9 to FIG. 11, if m=2, that is, when the network device transmits two synchronization signal blocks to the terminal device, three conditions (condition 1, condition 2, and condition 3) can be satisfied between the two time-domain resource units over which the two synchronization signal blocks are transmitted, among the multiple time-domain resource sets over which the two synchronization signal blocks are capable of being transmitted.

The condition 1 is: the m time-domain resource units over which the m synchronization signal blocks are transmitted are continuous (transmission period of synchronization signal blocks can be spanned); the condition 2 is: the m time-domain resource units over which the m synchronization signal blocks are transmitted are continuous (transmission period of synchronization signal blocks cannot be spanned); the condition 3 is: the m time-domain resource units over which the m synchronization signal blocks are transmitted are spaced by k time-domain resource units (k is even).

As shown in FIG. 9, for the condition 1, assuming that the number of the time-domain resource units over which the two synchronization signal blocks are capable of being transmitted is k=4 (from time-domain resource unit 1 to time-domain resource unit 4), the number of multiple time-domain resource sets over which the two synchronization signal blocks are capable of being transmitted and satisfy the first condition is n=4, where the four time-domain resource sets respectively include: time-domain resource unit 1 and time-domain resource unit 2 (indicated by "01"), time-domain resource unit 2 and time-domain resource unit 3 (indicated by "10"), time-domain resource unit 3 and time-domain resource unit 4 (indicated by "11"), and time-domain resource unit 1 and time-domain resource unit 4 (indicated by "00"). Here the number of bits occupied by the information for indicating the time-domain resource set in the transmission information is $\lceil \log_2(4) \rceil=2$.

If the network device uses the condition 1 and transmits the two synchronization signal blocks to the terminal device on the time-domain resource unit 1 and the time-domain resource unit 2, then the transmission information of the synchronization signal blocks transmitted by the network device to the terminal device includes information for indicating that m=2, information for indicating the condition 1, and information of 2 bits (i.e., "01") indicating the time-domain resource set over which the two synchronization signal blocks are transmitted.

As shown in FIG. 10, for the condition 2, assuming that the number of the time-domain resource units over which the two synchronization signal blocks are capable of being transmitted is k=4 (from time-domain resource unit 1 to time-domain resource unit 4), the number of multiple time-domain resource sets over which the two synchronization signal blocks are capable of being transmitted and satisfy the first condition is n=3, where the three time-domain resource sets respectively include: time-domain resource unit 1 and time-domain resource unit 2 (indicated by "01"), time-domain resource unit 2 and time-domain resource unit 3 (indicated by "10"), and time-domain resource unit 3 and time-domain resource unit 4 (indicated by "11"). Here the number of bits occupied by the information for indicating the time-domain resource set in the transmission information is $\lceil\log_2(3)\rceil=2$.

If the network device uses the condition 2 and transmits the two synchronization signal blocks to the terminal device over the time-domain resource unit 2 and the time-domain resource unit 3, then the transmission information of the synchronization signal blocks transmitted by the network device to the terminal device includes information for indicating that m=2, information for indicating the condition 2, and information of 2 bits (i.e., "10") indicating the time-domain resource set over which the two synchronization signal blocks are transmitted.

As shown in FIG. 11, for the condition 3, assuming that the number of the time-domain resource units over which the two synchronization signal blocks are capable of being transmitted is k=4 (from time-domain resource unit 1 to time-domain resource unit 4), the number of multiple time-domain resource sets over which the two synchronization signal blocks are capable of being transmitted and satisfy the first condition is n=2, where the two time-domain resource sets respectively include: time-domain resource unit 1 and time-domain resource unit 3 (indicated by "0"), and time-domain resource unit 2 and time-domain resource unit 4 (indicated by "1"). Here the number of bits occupied by the information for indicating the time-domain resource set in the transmission information is $\lceil\log_2(2)\rceil=1$.

If the network device uses the condition 3 and transmits the two synchronization signal blocks to the terminal device over the time-domain resource unit 1 and the time-domain resource unit 3, then the transmission information of the synchronization signal blocks transmitted by the network device to the terminal device includes information for indicating that m=2, information for indicating the condition 3, and information of 1 bit (i.e., "0") indicating the time-domain resource set over which the two synchronization signal blocks are transmitted.

Of course, the first condition may also be: the m time-domain resource units over which the m synchronization signal blocks are transmitted in each time-domain resource set include specific symbols, for example, the time-domain resource set includes the first four symbols, the time-domain resource set includes the last four symbols, the time-domain resource set includes symbols of odd numbers, or the time-domain resource set includes symbols of even numbers, and the like. The present disclosure does not limit this.

Therefore, in the embodiment of the present disclosure, when transmitting the synchronization signal blocks, the network device indicates the number of the synchronization signal blocks and corresponding specific time-domain locations to the terminal device, thereby an indication of the locations of the time-domain resources of the synchronization signal blocks can be achieved using few bits and the signaling overhead is reduced.

In 520, the network device transmits the transmission information to the terminal device.

Specifically, the network device may transmit the transmission information to the terminal device, so that the terminal device receives, according to the transmission information, the m synchronization signal block transmitted by the network device over the time-domain resource over which the m synchronization signal block is transmitted.

In 530, the terminal device receives the transmission information transmitted by the network device.

The transmission information includes information on the number m of the synchronization signal block and information on the time-domain resource set over which the m synchronization signal block is transmitted.

Where $\lceil\log_2(n)\rceil$ represents the number of bits occupied by the information on the time-domain resource set in the transmission information, where n represents the number of multiple time-domain resource sets over which the m synchronization signal block is capable of being transmitted, and locations of the m time-domain resource units over which the m synchronization signal blocks are transmitted in different time-domain resource sets are not completely the same, where m is a positive integer, and n is a positive integer.

Each time-domain resource set in the multiple time-domain resource sets includes at least one time-domain resource unit. In an embodiment, the time-domain resource unit includes at least one symbol. One synchronization signal block may be transmitted over one time-domain resource unit.

In an embodiment, the time-domain synchronization signal block includes at least one of the following signals: a primary synchronization signal (PSS), a secondary synchronization signal (SSS), and a physical broadcast channel (PBCH).

Further, the PBCH may carry a corresponding demodulation reference signal (DMRS).

In 540, the terminal device receives the m synchronization signal block transmitted by the network device according to the transmission information.

Specifically, the specific process that the terminal device receives the m synchronization signal blocks transmitted by the network device over time-domain resources for transmitting the m synchronization signal blocks according to the transmission information may refer to the related description to 510 in FIG. 6 to FIG. 11, which will not be repeated here for the sake of brevity.

Therefore, in the embodiment of the present disclosure, when receiving the synchronization signal blocks, the terminal device obtains the number of the synchronization signal blocks and corresponding specific time-domain locations indicated by the terminal device, thereby the locations of the time-domain resources of the synchronization signal blocks can be obtained using few bits and the signaling overhead is reduced.

It should be understood that, in the various embodiments of the present disclosure, the size of the sequence number of each of the foregoing processes does not mean an order of execution sequence, and the order of execution of each of the processes should be determined by its function and internal logic, and should not constitute any limitation to the implementation process of the embodiments of the present disclosure.

Figure 12:
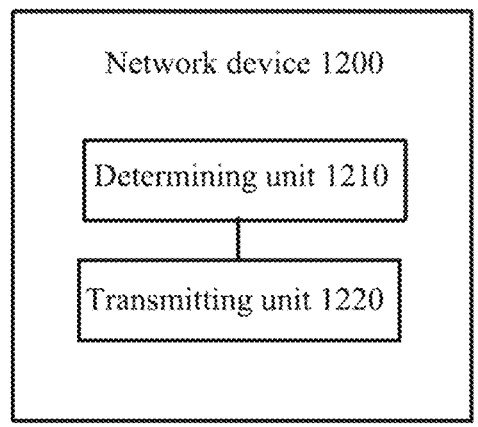
FIG. 12 is a schematic block diagram of a network device according to an embodiment of the present application.

FIG. 12 is a schematic block diagram of a network device 1200 according to an embodiment of the present disclosure. As shown in FIG. 12, the network device 1200 includes a determining unit 1210 and a transmitting unit 1220. Where:

the determining unit 1210 is configured to determine transmission information of a synchronization signal block, where the transmission information includes information on the number m of the synchronization signal block, and information on a time-domain resource set over which the m synchronization signal block is transmitted, where the time-domain resource set includes m time-domain resource unit over which the m synchronization signal block is transmitted, and locations of m time-domain resource units in different time-domain resource sets are not completely the same, where m is a positive integer; and the transmitting unit 1220 is configured to transmit the transmission information determined by the determining unit 1210 to a terminal device, so that the terminal device receives, according to the transmission information, the m synchronization signal block transmitted by the network device.

Therefore, in the embodiment of the present disclosure, when transmitting the synchronization signal blocks, the network device indicates the number of the synchronization signal blocks and corresponding specific time-domain locations to the terminal device, thereby an indication of the locations of the time-domain resources of the synchronization signal blocks can be achieved using few bits and the signaling overhead is reduced.

In an embodiment, $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, $n=C_k^m$, k represents the number of time-domain resource unit over which the m synchronization signal block is capable of being transmitted, k is a positive integer, and $k \geq m$.

In an embodiment, location of time-domain resource unit in each of the time-domain resource sets among the multiple time-domain resource sets satisfies a first condition.

In an embodiment, the first condition is determined by the network device, or agreed by the network device and the terminal device in advance.

In an embodiment, the transmission information further includes resource configuration information, where the resource configuration information is configured to indicate the first condition that the locations of the m time-domain resource units in each of the time-domain resource sets should satisfy.

In an embodiment, the first condition includes: among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, the fixed number is determined by the network device, or agreed by the network device and the terminal device in advance.

In an embodiment, each of the m time-domain resource units includes at least one symbol.

In an embodiment, the synchronization signal block includes at least one of the following signals: a primary synchronization signal (PSS), a secondary synchronization signal (SSS), and a physical broadcast channel (PBCH).

Figure 13:
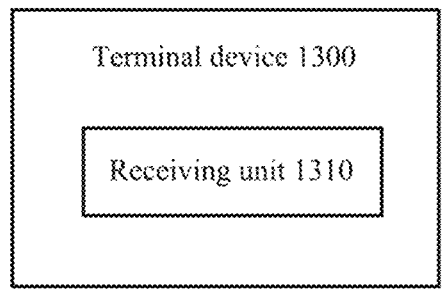
FIG. 13 is a schematic block diagram of a terminal device according to an embodiment of the present application.

FIG. 13 is a schematic block diagram of a terminal device 1300 according to an embodiment of the present disclosure. As shown in FIG. 13, the terminal device 1300 includes a receiving unit 1310.

The receiving unit 1310 is configured to receive transmission information of a synchronization signal block transmitted by a network device, where the transmission information includes information on the number m of the synchronization signal block, and information on a time-domain resource set over which the m synchronization signal block is transmitted, where the time-domain resource set includes m time-domain resource units over which the m synchronization signal block is transmitted, and locations of m time-domain resource units in different time-domain resource sets are not completely the same, where m is a positive integer; and the receiving unit 1310 is further configured to receive the m synchronization signal block transmitted by the network device according to the transmission information.

Therefore, in the embodiment of the present disclosure, when receiving the synchronization signal blocks, the terminal device obtains the number of the synchronization signal blocks and corresponding specific time-domain locations indicated by the terminal device, thereby the locations of the time-domain resources of the synchronization signal blocks can be obtained using few bits and the signaling overhead is reduced.

In an embodiment, $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, $n=C_k^m$, k represents the number of time-domain resource unit over which the m synchronization signal block is capable of being transmitted, k is a positive integer, and $k \geq m$.

In an embodiment, where location of the m time-domain resource unit in each of the time-domain resource sets among the multiple time-domain resource sets satisfies a first condition.

In an embodiment, the first condition is determined by the network device, or agreed by the terminal device and the network device in advance.

In an embodiment, the transmission information further includes resource configuration information, where the resource configuration information is configured to indicate the first condition that the locations of the m time-domain resource units in each of the time-domain resource sets should satisfy.

In an embodiment, the first condition includes: among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, the fixed number is determined by the network device, or agreed by the network device and the terminal device in advance.

In an embodiment, each of the m time-domain resource units includes at least one symbol.

In an embodiment, the synchronization signal block includes at least one of the following signals: a primary synchronization signal (PSS), a secondary synchronization signal (SSS), and a physical broadcast channel (PBCH).

Figure 14:
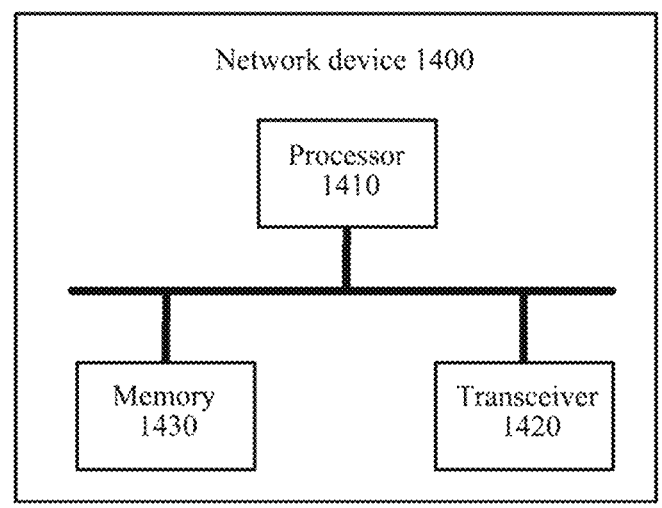
FIG. 14 is a schematic structural diagram of a network device according to an embodiment of the present application.

FIG. 14 is a schematic structural diagram of a network device 1400 according to an embodiment of the present disclosure. As shown in FIG. 14, the network device includes: a processor 1410, a transceiver 1420 and a memory 1430. The processor 1410, the transceiver 1420, and the memory 1430 communicate with one another via internal connection paths. The memory 1430 is configured to store instructions, and the processor 1410 is configured to execute the instructions stored in the memory 1430 to control the transceiver 1420 to receive a signal or transmit a signal.

The processor 1410 is configured to determine transmission information of a synchronization signal block, where the transmission information includes information on the number m of the synchronization signal block, and information on a time-domain resource set over which the m synchronization signal block is transmitted, where the time-domain resource set includes m time-domain resource units over which the m synchronization signal block is transmitted, and locations of m time-domain resource units in different time-domain resource sets are not completely the same, where m is a positive integer.

The transceiver 1420 is configured to transmit the transmission information determined by the processor 1410 to the terminal device, so that the terminal device receives the m synchronization signal block transmitted by the network device according to the transmission information.

In an embodiment, in the transmission information, $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, $n=C_k^m$, k represents the number of time-domain resource unit over which the m synchronization signal block is capable of being transmitted, k is a positive integer, and $k \geq m$.

In an embodiment, location of the m time-domain resource unit in each of the time-domain resource sets among the multiple time-domain resource sets satisfies a first condition.

In an embodiment, the first condition is determined by the network device, or agreed by the network device and the terminal device in advance.

In an embodiment, the transmission information further includes resource configuration information, where the resource configuration information is configured to indicate the first condition that the locations of the m time-domain resource units in each of the time-domain resource sets should satisfy.

In an embodiment, the first condition includes: among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, the fixed number is determined by the network device, or agreed by the network device and the terminal device in advance.

In an embodiment, each of the m time-domain resource units includes at least one symbol.

In an embodiment, the synchronization signal block includes at least one of the following signals: a primary synchronization signal (PSS), a secondary synchronization signal (SSS), and a physical broadcast channel (PBCH).

It should be understood that, in the embodiment of the present disclosure, the processor 1410 may be a central processing unit (CPU), and the processor 1410 may also be other general purpose processors, digital signal processors (DSPs), application specific integrated circuits (ASIC), field programmable gate array (FPGA) or other programmable logic devices, discrete gate or transistor logic devices, discrete hardware components, or the like. A general purpose processor may be a microprocessor or the processor may also be any conventional processor or the like.

The memory 1430 may include a read only memory and a random access memory, and provides instructions and data to the processor 1410. A portion of the memory 1430 may further include a non-volatile random access memory. For example, the memory 1430 may also store information of device type.

In the implementation process, each step of the above methods may be completed by an integrated logic circuit of hardware or an instruction in a form of software in the processor 1410. The steps of the method for transmitting a signal disclosed in the embodiments of the present disclosure may be directly performed by a hardware processor, or may be performed by a combination of hardware and software modules in the processor 1410. The software modules may be located in a mature storage medium in the field such as a random access memory, a flash memory, a read only memory, a programmable read only memory or an electrically erasable programmable memory, a register, or the like. The storage medium is located in the memory 1430, and the processor 1410 reads the information in the memory 1430, and completes the steps of the above methods in conjunction with its hardware. To avoid repetition, it will not be described in detail here.

The network device 1400 according to the embodiment of the present disclosure may correspond to the network device for performing the method 500 in the foregoing method 500, and the network device 1200 according to the embodiment of the present disclosure, and each unit or module in the network device 1400 is used for performing the operations or processes performed by the network device in the above method 500, respectively. Here, in order to avoid redundancy, detailed description thereof will be omitted.

Figure 15:
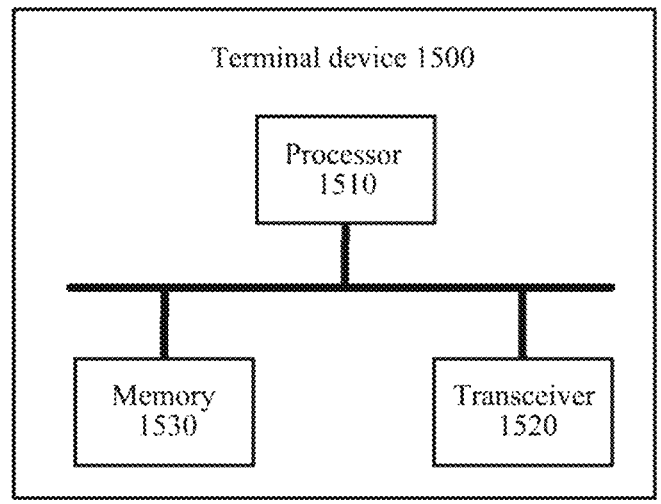
FIG. 15 is a schematic structural diagram of a terminal device according to an embodiment of the present application.

FIG. 15 is a schematic structural diagram of a terminal device 1500 according to an embodiment of the present disclosure. As shown in FIG. 15, the terminal device includes: a processor 1510, a transceiver 1520 and a memory 1530. The processor 1510, the transceiver 1520, and the memory 1530 communicate with one another via internal connection paths. The memory 1530 is configured to store instructions, and the processor 1510 is configured to execute the instructions stored in the memory 1530 to control the transceiver 1520 to receive a signal or transmit a signal.

The transceiver 1520 is configured to: receiving transmission information of a synchronization signal block transmitted by a network device, where the transmission information includes information on the number m of the synchronization signal block, and information on a time-domain resource set over which the m synchronization signal block is transmitted, where the time-domain resource set includes m time-domain resource units over which the m synchronization signal block is transmitted, and locations of m time-domain resource units in different time-domain resource sets are not completely the same, where m is a positive integer; and receiving the m synchronization signal blocks transmitted by the network device according to the transmission information.

In an embodiment, in the transmission information, $\lceil \log_2(n) \rceil$ represents the number of bits occupied by the information on the time-domain resource set in the transmission information, where n represents the number of multiple time-domain resource sets over which the m synchronization signal block is capable of being transmitted, and n is a positive integer.

In an embodiment, $n=C_k^m$, k represents the number of time-domain resource unit over which the m synchronization signal block is capable of being transmitted, k is a positive integer, and $k \geq m$.

In an embodiment, location of the m time-domain resource unit in each of the time-domain resource sets among the multiple time-domain resource sets satisfies a first condition.

In an embodiment, the first condition is determined by the network device, or agreed by the network device and the terminal device in advance.

In an embodiment, the transmission information further includes resource configuration information, where the resource configuration information is configured to indicate the first condition that the locations of the m time-domain resource units in each of the time-domain resource sets should satisfy.

In an embodiment, the first condition includes: among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

In an embodiment, the fixed number is determined by the network device, or agreed by the network device and the terminal device in advance.

In an embodiment, each of the m time-domain resource units includes at least one symbol.

In an embodiment, the synchronization signal block includes at least one of the following signals: a primary synchronization signal (PSS), a secondary synchronization signal (SSS), and a physical broadcast channel (PBCH).

It should be understood that, in the embodiment of the present disclosure, the processor 1510 may be a central processing unit (CPU), and the processor 1510 may also be other general purpose processors, digital signal processors (DSPs), application specific integrated circuits (ASIC), field programmable gate array (FPGA) or other programmable logic devices, discrete gate or transistor logic devices, discrete hardware components, or the like. A general purpose processor may be a microprocessor or the processor may also be any conventional processor or the like.

The memory 1530 may include a read only memory and a random access memory, and provides instructions and data to the processor 1510. A portion of the memory 1530 may further include a non-volatile random access memory. For example, the memory 1530 may also store information of device type.

In the implementation process, each step of the above methods may be completed by an integrated logic circuit of hardware or an instruction in a form of software in the processor 1510. The steps of the method for transmitting a signal disclosed in the embodiments of the present disclosure may be directly performed by a hardware processor, or may be performed by a combination of hardware and software modules in the processor 1510. The software modules may be located in a mature storage medium in the field such as a random access memory, a flash memory, a read only memory, a programmable read only memory or an electrically erasable programmable memory, a register, or the like. The storage medium is located in the memory 1530, and the processor 1510 reads the information in the memory 1530, and completes the steps of the above methods in conjunction with its hardware. To avoid repetition, it will not be described in detail here.

The terminal device 1500 according to the embodiment of the present disclosure may correspond to the network device for performing the method 500 in the foregoing method 500, and the terminal device 1300 according to the embodiment of the present disclosure, and each unit or module in the terminal device 1500 is used for performing the operations or processes performed by the terminal device in the above method 500, respectively. Here, in order to avoid redundancy, detailed description thereof will be omitted.

Figure 16:
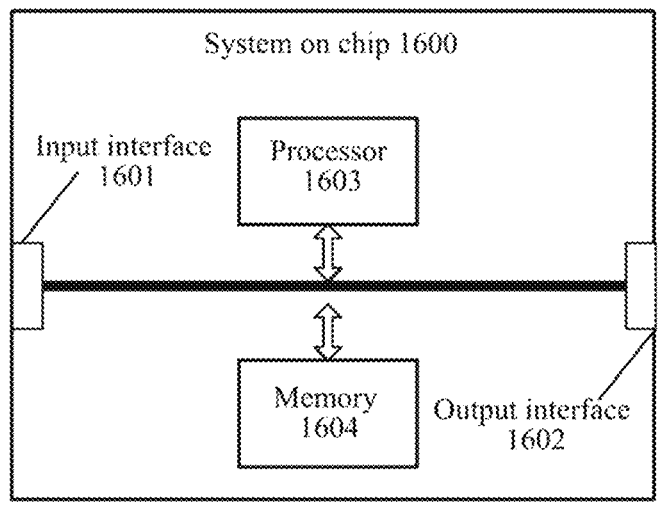
FIG. 16 is a schematic structural diagram of a system on chip according to an embodiment of the present application.

FIG. 16 is a schematic structural diagram of a system on chip according to an embodiment of the present disclosure. The system on chip 1600 of FIG. 16 includes an input interface 1601, an output interface 1602, at least one processor 1603, and a memory 1604, where the input interface 1601, the output interface 1602, the processor 1603, and the memory 1604 are connected with one another via internal connection paths. The processor 1603 is configured to execute codes in the memory 1604.

In an embodiment, when the codes are executed, the processor 1603 can implement the method 500 performed by the network device in the method embodiment. For the sake of brevity, it will not be repeated here.

In an embodiment, when the codes are executed, the processor 1603 can implement the method 500 performed by the terminal device in the method embodiment. For the sake of brevity, it will not be repeated here.

Those of ordinary skill in the art will appreciate that the units and algorithm steps of the various examples described in connection with the embodiments disclosed herein can be implemented in electronic hardware, or a combination of computer software and electronic hardware. Whether these functions are performed in hardware or software depends on the specific application and design constraints of the technical solutions. A person skilled in the art may implement the described functions in different ways for each particular application, but such an implementation should not be considered to be beyond the scope of the present disclosure.

A person skilled in the art can clearly understand that for the convenience and brevity of the description, the specific working process of the system, the device and the unit described above can refer to the corresponding process in the foregoing method embodiment, which will not be repeated herein.

In the several embodiments provided by the present disclosure, it should be understood that the disclosed system, device and method may be implemented in other manners. For example, the device embodiments described above are merely illustrative. For example, the division of the units is only a division of logical functions. In actual implementation, there may be another division manner, for example, multiple units or components may be combined or integrated into another system, or some features may be ignored or not implemented. Moreover, the mutual coupling, direct coupling or communication connection shown or discussed may be an indirect coupling or communication connection through some interfaces, devices or units, and may be in an electrical, mechanical or other form.

The units described as discrete components may be or may not be physically separated, and the components illustrated as units may be or may not be physical units, that is, may be located in one place, or may be distributed to multiple network units. Some or all of the units may be selected according to actual needs to achieve the objectives of the solutions of the embodiments.

In addition, each functional unit in each embodiment of the present disclosure may be integrated into one processing unit, or each unit may exist physically separately, or two or more units may be integrated into one unit.

If the function is implemented as a software functional unit and sold or used as a standalone product, it can be stored in a computer readable storage medium. Based on such understanding, the technical solutions of the present disclosure, which are essential or the parts contribute to the prior art, or a part of a technical solution, may be embodied in a form of a software product, and the computer software product is stored in a storage medium, including some instructions used to cause a computer device (which may be a personal computer, server, or network device, etc.) to perform all or part of the steps of the methods described in various embodiments of the present disclosure. The foregoing storage medium includes various media that can store program codes such as a U disk, a mobile hard disk, a read-only memory (ROM), a random access memory (RAM), a magnetic disk, or an optical disk.

The above is only the specific embodiments of the present disclosure, but the scope of protection of the embodiments of the disclosure is not limited thereto. Any variation or replacement that may be readily contemplated by anyone skilled in the art within the scope of technology disclosed by the embodiments of the present disclosure shall be covered by the scope of protection of the present disclosure for personal gain. Therefore, the scope of protection of the embodiments of the present disclosure should be determined by the scope of protection of the claims.

What is claimed is:

1. A method for transmitting a signal, wherein the method comprises:
    receiving, by a terminal device, transmission information of a synchronization signal block transmitted by a network device, wherein the transmission information comprises information on the number m of the synchronization signal block, and information on a time-domain resource set over which the m synchronization signal block is transmitted, wherein the time-domain resource set comprises m time-domain resource units over which the m synchronization signal block is transmitted, the information on a time-domain resource set over which the m synchronization signal block is transmitted represents the m time-domain resource units over which the m synchronization signal block is transmitted, and for different time-domain resource sets, locations of m time-domain resource units are not completely the same for at least two consecutive slots with respect to a start and end of the respective slot carrying the m time-domain resource units, wherein each slot has 14 symbols, m is a positive integer, and m>1; and
    receiving, by the terminal device, the m synchronization signal block transmitted by the network device according to the transmission information;
    wherein locations of the m time-domain resource units in each of the time-domain resource sets among the multiple time-domain resource sets over which the m synchronization signal block is capable of being transmitted satisfy a first condition, and the first condition is agreed by the network device and the terminal device in advance.

2. The method according to claim 1, wherein $\lceil \log_2(n) \rceil$ represents the number of bits occupied by the information on the time-domain resource set in the transmission information, wherein n represents the number of multiple time-domain resource sets over which the m synchronization signal block is capable of being transmitted, and n is a positive integer.

3. The method according to claim 1, wherein $n=C_k^m$, n represents the number of multiple time-domain resource sets over which the m synchronization signal block is capable of being transmitted, n is a positive integer, k represents the number of time-domain resource unit over which the m synchronization signal block is capable of being transmitted, k is a positive integer, and k≤m.

4. The method according to claim 1, wherein the first condition comprises:
    among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

5. The method according to claim 4, wherein the fixed number is determined by the network device, or agreed by the network device and the terminal device in advance.

6. The method according to claim 1, wherein each of the m time-domain resource units comprises at least one symbol.

7. A network device, comprising:
    a processor, a transceiver and a memory, wherein the processor, the transceiver, and the memory communicate with one another, the memory is configured to store instructions, and the processor is configured to execute the instructions stored in the memory;
    the processor is configured to determine transmission information of a synchronization signal block, wherein the transmission information comprises information on the number m of the synchronization signal block, and information on a time-domain resource set over which the m synchronization signal block is transmitted,
    wherein the time-domain resource set comprises m time-domain resource unit over which the m synchronization signal block is transmitted, the information on a time-domain resource set over which the m synchronization signal block is transmitted represents the m time-domain resource units over which the m synchronization signal block is transmitted, and for different time-domain resource sets, locations of m time-domain resource units are not completely the same for at least two consecutive slots with respect to a start and end of the respective slot carrying the m time-domain resource units, wherein each slot has 14 symbols, m is a positive integer, and m>1; and
    the transceiver is configured to transmit the transmission information to a terminal device, so that the terminal device receives, according to the transmission information, the m synchronization signal block transmitted by the network device;
    wherein locations of the m time-domain resource units in each of the time-domain resource sets among multiple time-domain resource sets over which the m synchronization signal block is capable of being transmitted satisfy a first condition, and the first condition is agreed by the network device and the terminal device in advance.

8. The network device according to claim 7, wherein $\lceil \log_2(n) \rceil$ represents the number of bits occupied by the information on the time-domain resource set in the transmission information, wherein n represents the number of multiple time-domain resource sets over which the m synchronization signal block is capable of being transmitted, and n is a positive integer.

9. The network device according to claim 7, wherein $n=C_k^m$, n represents the number of multiple time-domain resource sets over which the m synchronization signal block is capable of being transmitted, n is a positive integer, k represents the number of time-domain resource unit over which the m synchronization signal block is capable of being transmitted, k is a positive integer, and k≤m.

10. The network device according to claim 7, wherein the transmission information further comprises resource configuration information, wherein the resource configuration information is configured to indicate the first condition that the locations of the m time-domain resource units in each of the time-domain resource sets should satisfy.

11. The network device according to claim 7, wherein the first condition comprises:
among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

12. The network device according to claim 11, wherein the fixed number is determined by the network device, or agreed by the network device and the terminal device in advance.

13. The network device according to claim 7, wherein each of the m time-domain resource units comprises at least one symbol.

14. The network device according to claim 7, wherein the synchronization signal block comprises at least one of the following signals:
a primary synchronization signal (PSS), a secondary synchronization signal (SSS), and a physical broadcast channel (PBCH).

15. A terminal device, comprising: a processor, a transceiver and a memory, wherein the processor, the transceiver, and the memory communicate with one another, the memory is configured to store instructions, and the processor is configured to execute the instructions stored in the memory;
the transceiver is configured to receive transmission information of a synchronization signal block transmitted by a network device, wherein the transmission information comprises information on the number m of the synchronization signal block, and information on a time-domain resource set over which the m synchronization signal block is transmitted, wherein the time-domain resource set comprises m time-domain resource units over which the m synchronization signal block is transmitted, the information on a time-domain resource set over which the m synchronization signal block is transmitted represents the m time-domain resource units over which the m synchronization signal block is transmitted, and for different time-domain resource sets, locations of m time-domain resource units in are not completely the same for at least two consecutive slots with respect to a start and end of the respective slot carrying the m time-domain resource units, wherein each slot has 14 symbols, wherein m is a positive integer, and m>1; and
the transceiver is further configured to receive the m synchronization signal block transmitted by the network device according to the transmission information;
wherein locations of the m time-domain resource units in each of the time-domain resource sets among multiple time-domain resource sets over which the m synchronization signal block is capable of being transmitted satisfy a first condition, and the first condition is agreed by the network device and the terminal device in advance.

16. The terminal device according to claim 15, wherein $\lceil \log_2(n) \rceil$ represents the number of bits occupied by the information on the time-domain resource set in the transmission information, wherein n represents the number of multiple time-domain resource sets over which the m synchronization signal block is capable of being transmitted, and n is a positive integer.

17. The terminal device according to claim 15, wherein $n=C_k^m$, n represents the number of multiple time-domain resource sets over which the m synchronization signal block is capable of being transmitted, n is a positive integer, k represents the number of time-domain resource unit over which the m synchronization signal block is capable of being transmitted, k is a positive integer, and k≤m.

18. The terminal device according to claim 15, wherein the transmission information further comprises resource configuration information, wherein the resource configuration information is configured to indicate the first condition that the locations of the m time-domain resource units in each of the time-domain resource sets should satisfy.

19. The terminal device according to claim 15, wherein the first condition comprises:
among k time-domain resource units over which m synchronization signal blocks are capable of being transmitted, the m time-domain resource units over which the m synchronization signal blocks are transmitted in each of the time-domain resource sets are continuous, or the m time-domain resource units over which the m synchronization signal blocks are transmitted in each of the time-domain resource sets are spaced by a fixed number of time-domain resource units.

20. The terminal device according to claim 15, wherein each of the m time-domain resource units comprises at least one symbol.

21. The terminal device according to claim 15, wherein the synchronization signal block comprises at least one of the following signals:
a primary synchronization signal (PSS), a secondary synchronization signal (SSS), and a physical broadcast channel (PBCH).

* * * * *